May 6, 1941.  C. F. GREINER  2,240,886
COUPLING DEVICE
Filed Aug. 6, 1940  2 Sheets-Sheet 1
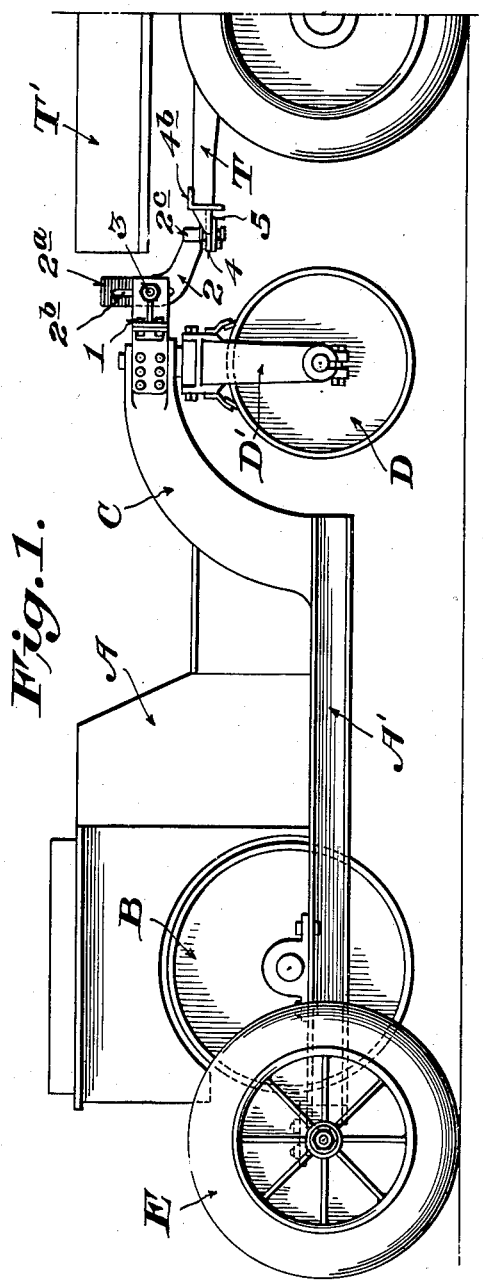
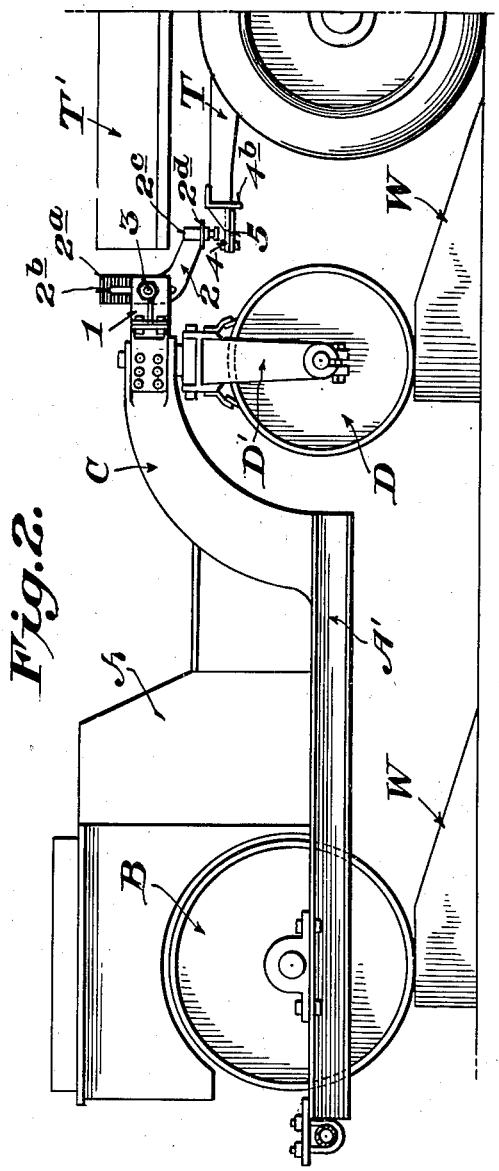
Inventor
Carl F. Greiner
By Alexander Dowell
Attorneys May 6, 1941.  C. F. GREINER  2,240,886
COUPLING DEVICE
Filed Aug. 6, 1940  2 Sheets-Sheet 2
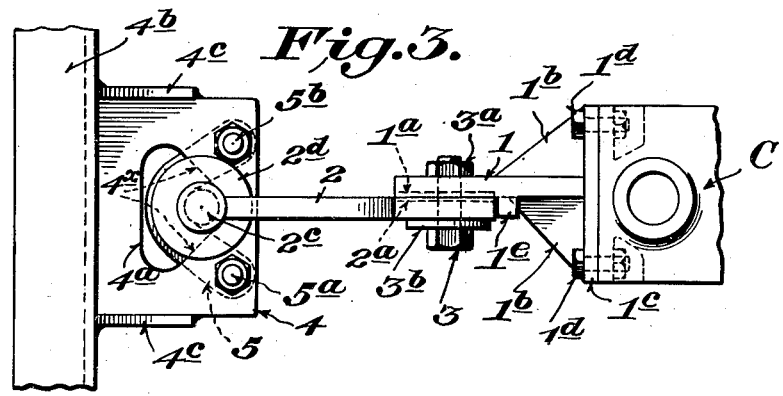
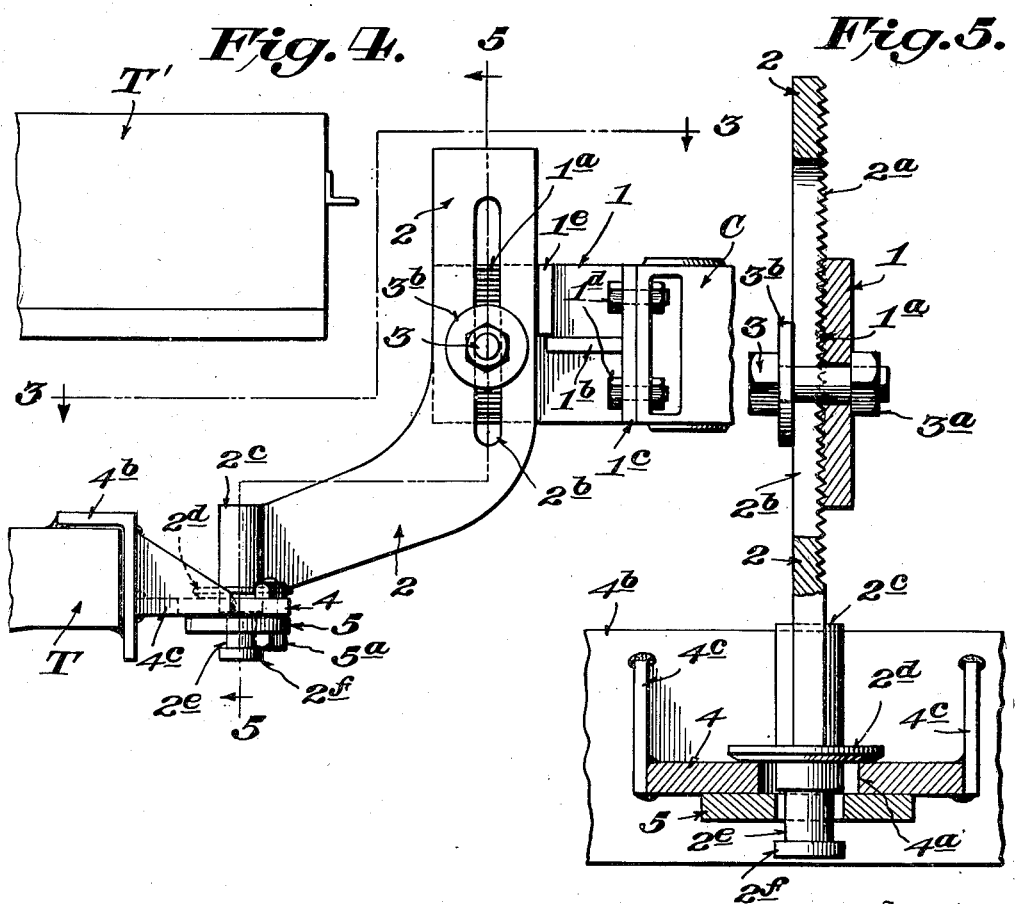
Carl F. Greiner, Inventor Patented May 6, 1941

2,240,886

UNITED STATES PATENT OFFICE 2,240,886

COUPLING DEVICE

Carl F. Greiner, Springfield, Ohio, assignor to The Buffalo-Springfield Roller Co., Springfield, Ohio, a corporation of Ohio Application August 6, 1940, Serial No. 351,573

5 Claims. (Cl. 280—33.15)

This invention is a novel improvement in coupling devices applicable to road rollers and/or other heavy normally slow-moving machines or vehicles, to adapt same for fast transportation from one job to another, the present invention being an improvement upon that shown in my U. S. Letters Patent No. 2,088,854, patented August 3, 1937.

For certain classes of road construction, it is desirable to utilize a small standard self-propelled road roller which can be easily and quickly transported to and from the work; and in my aforesaid Patent No. 2,088,854 the road roller was equiped with removable pneumatic-tired wheels at the rear end thereof which when applied would support the rear ground roll of the road roller above the ground surface, while the front end of said road roller was equipped with readily connectible coupling means whereby said front end could be suspended from the rear end of the chassis of a towing truck with the front or steering roll of the road roller raised above the ground surface; and the road roller thus suspended at the front and rear ends could be drawn by the towing truck at relatively high speeds from one job to another. However, in my aforesaid patent, in coupling the towing truck to the road roller (while the road roller was supported in raised position on suitable wedge blocks), it was necessary to back the towing truck into such position that the towing pin carried by the front end of the raised road roller was accurately aligned with a hole in a coupler plate carried by the towing truck, so that the towing pin could be lowered directly into the hole in said plate, which operation required considerable time and patience on the part of the operator in thus positioning the towing truck. Moreover, the towing pin in my aforesaid patent consisted of a vertical screw threaded into a casting mounted on the front end of the road roller, and in practice said screw had a tendency in service to bend to such extent that it could not be rotated and thereby raised or lowered with respect to the hole in the coupler plate.

The principal object of my present invention is to provide a coupling device in which the vertical movement of the towing pin is obtained by vertically shifting a novel towing plate carrying said pin and mounted on the road roller, and to provide the coupler plate carried by the towing truck with an enlarged hole readily receiving the comparatively small pin, said coupler plate also having means thereon for constricting the hole therein after the towing pin has been entered thereinto, so as to prevent the towing pin from becoming disengaged from the coupler plate. Such arrangement dispenses with the necessity of having to first back the towing truck into an accurate position with respect to the road roller before the coupling can be effected, since the comparatively small towing pin can be readily inserted in the enlarged hole in the coupler plate, and the truck then moved ahead a short distance causing the pin to assume its normal position against the rear wall of the hole in the coupler plate, and the swinging hook then swung and locked into place to constrict the enlarged hole to such size that the towing pin cannot become disengaged therefrom, thereby coupling the roller to the towing truck.

Other minor objects of the invention will be hereinafter set forth.

I will explain the invention with reference to the accompanying drawings which illustrate one practical embodiment thereof to enable others familiar with the art to adopt and use the same; and will summarize in the claims, the novel features of construction, and novel combinations of parts, for which protection is desired.

In said drawings—

Fig. 1 is a side elevation of a conventional road roller of the tandem type equipped with detachable transporting wheels supporting the rear end of the road roller frame so that the rear ground roll is maintained above the road surface; also showing my novel coupling device at front end of the road roller frame engaged with the coupler plate of the towing truck so that the front steering roll of the road roller is likewise maintained raised above the road surface.

Fig. 2 is a view similar to Fig. 1 showing the road roller supported upon wedge blocks for the purpose of elevating the road roller into position for attachment of the front end of the roller frame to the towing truck.

Fig. 3 is an enlarged top plan view on the line 3—3, Fig. 4, showing the towing plate and coupler plate in locked position.

Fig. 4 is a side elevation of the parts shown in Fig. 3.

Fig. 5 is a vertical section on the line 5—5, Fig. 4.

The road roller is of conventional tandem type, having a frame comprising side members A reinforced at their lower ends by channel irons A', said side members carrying the usual motor or engine (not shown). A driving roll B is journaled in the side members A adjacent their rear ends. The front ends of the side members converge and terminate in a goose-neck portion C overlying the front steering roll D. The yoke D' of the front steering roll is mounted in trunnions in the outer portion of goose-neck C in the usual manner. The road roller thus far described is of conventional tandem type, the details thereof forming no part of my present invention.

Detachable pneumatic transporting wheels E may be provided at the rear end of the road roller as in my aforesaid Patent No. 2,088,854, for supporting the rear end of the roller when the road roller is coupled to the towing truck T, as shown in Fig. 1, said pneumatic wheels however forming no part of my present invention.

Secured to the front of goose-neck C is a casting 1 disposed on the longitudinal axis of the road roller frame, said casting having a horizontal web disposed edgewise and provided with horizontally disposed serrations 1a adapted to engage complementary serrations 2a on the substantially vertically disposed leg of an L-shaped towing plate 2 which leg is provided with a vertical slot 2b. A bolt 3 passes through slot 2b in the towing plate 2 and through a hole in the web of casting 1 and is provided with a nut 3a and washer 3b whereby when nut 3a is tightened the parts 1 and 2 will be rigidly held against vertical movement, but when nut 3a is loosened the towing plate 2 may be raised or lowered with respect to the web of casting 1.

Preferably the web of casting 1 is reinforced by horizontal flanges 1b extending from the sides of the web to a rear bolting flange 1c which is provided with holes registering with those in the front of goose-neck C for the reception of securing bolts 1d; also the web of casting 1 adjacent the upper edge thereof is provided with a vertically disposed lug 1e adapted to be engaged by the rear edge of the vertical leg of towing plate 2 above bolt 3 so as to offset any tendency of the leg of said towing plate 2 to be pulled out of its normal vertical position when the road roller is being towed.

The substantially horizontal leg of towing plate 2 is provided at its front end with a fixed pin 2c having a bearing flange 2d of substantial area adapted to seat upon the top of a coupler plate 4 carried by the towing truck T, the pin 2c below flange 2d being adapted to pass through an enlarged hole 4a in coupler plate 4 and to extend a substantial distance below the bottom of plate 4. The pin 2c below plate 4 is reduced in diameter, as at 2e, adjacent its lower end so as to form a head 2f on its lower end for the purpose hereinafter set forth.

Coupler plate 4 is horizontally mounted at the rear end of the chassis of truck T and is preferably welded to an angle iron 4b extending across the end of the chassis as indicated in Figs. 3 and 4, the plate 4 being disposed on substantially the axis of the truck, and reinforced by triangular webs 4c which are welded to angle iron 4b and to plate 4 as indicated. In event the truck T should cary a body T' which extends rearwardly of the chassis, the length of coupler plate 4 should be made such that a clearance of three or four inches would be provided between the vertical leg of the towing plate 2 and the rear face of body T' to permit the truck and road roller, when coupled together, to round curves.

The hole 4a in plate 4 is of relatively great width at its inner portion, while at its outer portion the side walls converge together in V-shaped arrangement as indicated at 4x (Fig. 3) so that the pin 2c when disposed at the apex of the converging walls 4x, which is its normal position, during towing, will be prevented from shifting laterally of the hole 4a.

Swingably mounted on the underside of coupler plate 4 is a swinging hook 5 pivoted at one end on a bolt 5a and adapted to curve around the reduced portion 2e of pin 2c and to have its other end removably secured by bolt 5b to coupler plate 4, said hook 5 confining the reduced portion 2e of towing pin 2c at the apex of the converging walls 4x of the hole 4a so that the head 2f at the lower end of pin 2c cannot become disengaged from the hole in coupler plate 4 but may rotate freely in the constricted opening formed in the plate 4 by the swinging hook 5 with the bearing portion 2d of pin 2c seated upon the upper face of coupler plate 4.

The above construction is simple, inexpensive, and easy to operate. When it is desired to transport the road roller to a new location, wedge blocks W (Fig. 2) are laid on the ground adjacent the peripheries of the front and rear rolls D and B, and the road roller then run by its own power onto the tops of the wedge blocks as shown to maintain the road roller sufficiently raised above the ground surface so that the pneumatic transporting wheels E can be secured to the rear end of the road roller frame as described in my aforesaid patent. While thus maintained on wedge blocks W the towing truck T is backed adjacent the front end of the road roller into a position that the relatively small towing pin 2c on the road roller is disposed directly above the relatively large hole 4a in coupler plate 4 carried by the towing truck. The bolt 3 is then loosened and the towing plate 2 lowered with respect to casting 1 until the bearing flange 2d of pin 2c seats upon the top of coupler plate 4, with the pin 2c entering the hole 4a, the swinging hook 5 being first swung aside to permit the pin to enter the hole. The bolt 3 is then again tightened to fix the relative positions of the towing plate 2 and casting 1. The towing truck is then moved forwardly a few feet, the road roller being then entirely supported by the rear transporting wheels E and by the towing plate 2, and the forward movement of the towing truck will cause pin 2c to move in hole 4a until it reaches the apex formed between the converging walls 4x, whereupon the swinging hook 5 is swung into operative position shown in Fig. 3 and locked by bolt 5b, thereby confining the towing pin 2c within the portion of opening 4a embraced between the apex thereof and the swinging hook 5. The towing truck can now be safely driven away at relatively high speeds with the road roller trailing.

When the towing truck arrives at the desired destination, wedge blocks W are again placed in proper position adjacent the rolls B and D of the road roller, and the latter then pushed by the truck up the inclines onto the flat upper portions of said blocks. The swinging hook 5 is then swung aside towards the angle iron 4b and the towing truck then moved slightly towards the road roller so that pin 2c will be approximately at the center of opening 4a, the road roller being supported entirely by the wedge blocks W. The bolt 3 is then loosened, and the towing plate 2 raised with respect to the casing 1 to move the pin 2c vertically out of the hole 4a in coupler plate 4, and the bolt 3 tightened to secure the parts 2 and 1 together. The pneumatic tired wheels E are then removed from the rear of the road roller, and the latter is then run down the wedge block W under its own power, and on to the work.

I claim:

1. Means for coupling the ends of towed and towing vehicles and for supporting the coupled end of the towed vehicle, comprising a horizontal coupler plate rigidly carried by the towing vehicle and provided with a relatively large opening therein having side walls converging towards the rear end of the hole; a relatively small towing pin rigidly carried by the towed vehicle and having a load carrying bearing flange adapted to seat upon the upper face of said plate, the portion of the pin below the flange extending through the hole and having an enlargement at its lower end; and a horizontally swingable member on the underside of the plate adapted in one position to partly encircle the front of the pin above the enlargement and to hold the pin at the apex of the converging walls of the hole to prevent withdrawal of the pin therefrom while permitting the pin to rotate in said hole; and means for locking ssaid member in said position.

2. Means for coupling the ends of towed and towing vehicles and for supporting the coupled end of the towed vehicle, comprising a horizontal coupler plate rigidly carried by the towing vehicle and provided with a relatively large opening therein having side walls converging towards the rear end of the hole; a relatively small towing pin rigidly carried by the towed vehicle and having a load carrying bearing flange adapted to seat upon the upper face of said plate, the portion of the pin below the flange extending through the hole and having an enlargement at its lower end; means for vertically adjusting the pin on the towed vehicle; and a horizontally swingable member on the underside of the plate adapted in one position to partly encircle the front of the pin above the enlargement and to hold the pin at the apex of the converging walls of the hole to prevent withdrawal of the pin therefrom while permitting the pin to rotate in said hole; and means for locking the member in said position.

3. In a coupling means as set forth in claim 2, said vertical adjusting means comprising a towing plate carrying the pin, said plate having serrations and having a vertically disposed slot in said serrated portion; a serrated member fixedly mounted on said towed vehicle and engaging the serrations of the towing plate; and a bolt passing through said slot and through said serrated member for removably securing the towing plate and member in adjusted positions.

4. In a coupling means as set forth in claim 2, said vertical adjusting means comprising a substantially L-shaped towing plate carrying the pin on its substantially horizontal leg, said plate having serrations on its vertical leg and having a vertically disposed slot in said vertical leg; a serrated member fixedly mounted on said towed vehicle and engaging the serrations of the vertical leg; and a bolt passing through said slot and through said serrated member for removably securing the towing plate and member in adjusted positions.

5. In a coupling means as set forth in claim 2, said vertical adjusting means comprising a substantially L-shaped towing plate carrying the pin on its substantially horizontal leg, said plate having serrations on its vertical leg and having a vertically disposed slot in said vertical leg; a serrated member fixedly mounted on said towed vehicle and engaging the serrations of the vertical leg; a bolt passing through said slot and through said serrated member for removably securing the towing plate and member in adjusted positions; and a lug on said member engaging the edge of the vertical leg to maintain the leg in vertical position.

CARL F. GREINER.